United States Patent [19]

Bryant et al.

[11] 4,222,925

[45] Sep. 16, 1980

[54] VULCANIZABLE SILICON TERMINATED POLYURETHANE POLYMER COMPOSITIONS HAVING IMPROVED CURE SPEED

[75] Inventors: Earle R. Bryant, Adrian, Mich.; Gerald H. Knittel, Waterville; Lon E. Dircks, Swanton, both of Ohio

[73] Assignee: Inmont Corporation, New York, N.Y.

[21] Appl. No.: 930,309

[22] Filed: Aug. 2, 1978

[51] Int. Cl.$^2$ ............................................. C08L 75/08
[52] U.S. Cl. .................................................. 260/37 N
[58] Field of Search .................. 260/37 N; 528/49, 28

[56] References Cited

U.S. PATENT DOCUMENTS

| | | | |
|---|---|---|---|
| 3,632,557 | 1/1972 | Brode et al. | 260/37 N |
| 3,979,344 | 9/1976 | Bryant et al. | 260/18 TN |
| 4,067,844 | 1/1978 | Barron et al. | 528/28 |

OTHER PUBLICATIONS

Damusis; Sealants; Reinhold Pub. Corp.; 1967; p. 88.

*Primary Examiner*—Lewis T. Jacobs

[57] ABSTRACT

Room-temperature-curable silicon-terminated organic sealant compositions having improved cure speeds, and metal and glass primer compositions for use therewith. These sealant compositions comprise a blend of a small amount of N-beta-aminoethyl, gamma - aminopropyl trimethoxy silane with an organosilicon-capped, isocyanate-terminated polyurethane polymer. The composition further comprises a carbon black filler containing less than 0.05% of water and preferably further comprises a moisture-curing catalyst such as dibutyl tin diacetate.

6 Claims, No Drawings

VULCANIZABLE SILICON TERMINATED POLYURETHANE POLYMER COMPOSITIONS HAVING IMPROVED CURE SPEED

BACKGROUND OF THE INVENTION

1. Field of the Invention

This invention relates to room-temperature-curable silicon terminated organic polymer sealant compositions having improved cure speeds, and to metal and glass primer compositions for use therewith.

This invention also relates to the use of such compositions as fast-curing sealants for vehicles and other uses. These sealants are especially useful for sealing glass to metal, such as to secure the windshield to an automobile body.

2. Description of the Prior Art

The relevant prior art is believed to be fully described in U.S. Pat. Nos. 3,632,557 and 3,979,344, the texts of which are incorporated herein by reference.

U.S. Pat. No. 3,632,557 describes vulcanizable silicon-terminated organic polymers whose formula and preparation can be graphically described as follows:

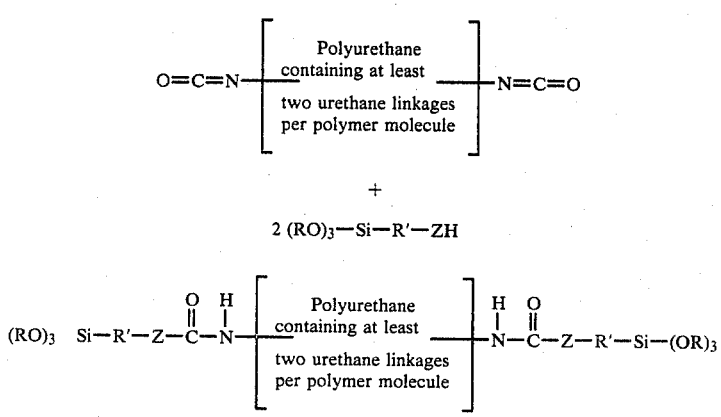

wherein R is a lower alkyl radical of from 1 to 6 carbon atoms; wherein R' is a divalent bridging radical selected from the groups consisting of a divalent hydrocarbon radical, a divalent hydrocarbon ether radical and a divalent hydrocarbon amino radical; and wherein Z is a member selected from the group consisting of —S and —NR", where R" is H or a lower alkyl radical of from 1 to 6 carbon atoms.

U.S. Pat. No. 3,979,344 describes a sealant comprised of vulcanizable silicon terminated polyurethane polymer, a small amount of N-beta aminoethyl, gamma aminopropyl trimethoxy silane and conventional sealant additives such as fillers, reinforcers, rheology modifiers and ultraviolet light screening compounds. Conventional carbon black (anhydrous) is disclosed as a filler.

SUMMARY OF THE INVENTION

Applicants in U.S. Pat. No. 3,979,344 found that, by blending a small amount of N-beta aminoethyl, gamma aminopropyl trimethoxy silane with the above-described prior art vulcanizable polymers in U.S. Pat. No. 3,632,557, they obtained a sealant composition having outstanding cure speed. Amounts from about 0.5 to about 2.0%, based on the weight of the polymer, were found to be particularly effective.

As an example of the cure rate required for automotive windshield sealants, one of the large auto companies requires a cleavage strength of at least 56 pounds/in$^2$ within 6 hours after the sealant is put in place. Use of the compositions disclosed in the above-mentioned U.S. patent have resulted in cure rates of 14–30 pounds within 6 hours, typically about 25 pounds. By contrast the sealants of the present invention have demonstrated 56 lbs/in$^2$ cleavage at 3½ hours curing time. The cleavage test used is described in the Appendix.

Applicants have now found that sealant compositions similar to those of U.S. Pat. No. 3,979,344 are greatly improved if a carbon black filler containing less than 0.05% by weight of water is used in the sealant. For instance, sealants containing high strength reinforcing carbon black dried to a moisture content of less than 0.05% produce sealants having suitable rheological properties and higher physical strengths. Commercial grades of carbon black, such as the Regal 300R used in the examples of U.S. Pat. No. 3,979,344, generally contain more than 0.05% moisture, e.g. up to 1.0% moisture.

DESCRIPTION OF THE PREFERRED EMBODIMENT

Applicants in U.S. Pat. No. 3,979,344 found that particularly good results were obtained when the organosilicon compound used in the formula above to cap the polymer is gamma aminipropyl trimethoxy silane and also when the amount of silanol curing catalyst used in the sealant composition does not exceed 0.1% based on the polymer weight. The preferred silanol condensation curing catalyst is dubutyltin diacetate. Amounts of N-beta aminoethyl gamma aminopropyl trimethoxy silane from about 0.2 to about 2.0%, based on the weight of the polymer, have been found to be required to meet the particularly demanding specifications of automotive windshield sealants, which are as follows:

| | |
|---|---|
| Curing Speed | at least 56 lbs/in$^2$ cleavage at 6 hours after application |
| Adhesion | excellent adhesion retention after prolonged weathering |
| Odor | no objectionable odor |
| Viscosity (before and after six months aging) | K value in the range of 450–850 |
| Slump | freedom from slump |
| Hardness | Shore "A" Durometer reading of less than 65. |

Description of the various tests for these specifications are set forth in the Appendix.

Applicants have now found that sealants described in U.S. Pat. No. 3,979,344 which contain reinforcing fillers such as carbon black can be improved in physical strengths by using a reinforcing carbon filler, especially a high strength carbon, provided that the filler has a moisture content of less than 0.05% by weight. Use of high strength reinforcing carbon blacks containing more than 0.05% of moisture, e.g. 0.05 to 0.10%, produces sealants having viscosities that are too high for many applications, e.g., as windshield sealants, because the handling and pumping equipment cannot apply the high viscosity materials at a fast enough rate to be practical. The use of especially dry carbon black in accordance with the present invention results in sealants having viscosities low enough for practical application as windshield sealants, while having higher solids, less shrinkage and lower cost.

Typical physical properties obtained using polymer described in Example 1 of U.S. Pat. No. 3,979,344 containing high strength reinforcing carbon versus ordinary carbon black are:

|  | Ordinary | High Strength |
|---|---|---|
| Tensile strength (psi) | 760 | 1100 |
| Elongation at break (%) | 140 | 300 |

Thus the advantages of using a high strength reinforcing carbon black are readily apparent. The improved physical properties are largely responsible for improvements in such properties as bond or cleavage strength.

High strength reinforcing carbon black used herein means carbon black with relatively high surface area and small particle size, e.g. a surface area of 80 square meters or more per gram and a particle size of 27 millimicrons diameter or less.

Generally, for use in automobile windshield applications the sealant must has a K value of 450 to 850, or viscosities of under 60 seconds at 60 psi. The K value requirement provides good non-slump (i.e., non-sag) properties and sealants having viscosities under 60 seconds at 60 psi generally fall within the required K value range, and have a viscosity low enough to be pumped at practical speeds through application equipment.

One disadvantage of sealants made in accordance with U.S. Pat. No. 3,979,344 is that the viscosity tends to vary from batch to batch, presumably due to variations in the water content of the carbon black used. This variation in viscosity and corresponding K values is illustrated in the following data for four different batches of sealant:

|  | 60 psi Viscosity | K Value |
|---|---|---|
| 1. | 16 | 519 |
| 2. | 18 | 468 |
| 3. | 49 | 433 |
| 4. | 62 | 455 |

These data show that the viscosity varies considerably using the invention of U.S. Pat. No. 3,979,344. By using the present invention, a higher grade of carbon black can be used to obtain more consistent viscosities from batch to batch and still maintain the required low K value.

Further, sealants made in accordance with the present invention show improved cleavage properties over those of U.S. Pat. No. 3,979,344. For example, the cleavage value of the sealant of Example 2 of said patent is 60 psi after 3½ hours of cure and 326 psi after 48 hours; the same formulation using high strength reinforcing carbon black containing less than 0.05% water had cleavage values of 70 psi after 3½ hours and 500 psi after 48 hours. This improvement in cleavage values is related to an improvement in the basic physical properties such as tensile and elongation properties.

The manner of preparing a typical sealant composition of this invention is set forth in the following examples.

EXAMPLE 1

A polymer of the type described in U.S. Pat. No. 3,632,557 was prepared as follows:

| A. | Niax PPG 2025 ONE | 2001.00 g. |
|---|---|---|
|  | (2000 Molecular Weight Polyether Diol from Union Carbide Corporation) |  |
|  | Hylene TM | 204.00 |
|  | (80:20 Grade Toluene Diisocyanate from DuPont) |  |
|  | Glacial Acetic Acid | 0.55 |
|  | Dibutyltin Diacetate | 0.45 |
| B. | Anhydrous Toluene | 110.00 |
| C. | Anhydrous Toluene | 81.00 |
|  | Silane A 1110 |  |
|  | (Gamma Aminopropyl trimethoxy silane from Union Carbide Corp.) | 68.30 |
| D. | Anhydrous Methanol | 273.00 |
|  |  | 2738.30 g. |

A was heated to 155 degrees F. under anhydrous conditions and maintained at that temperature for 55 minutes, at the end of which time B was added. Over the next 45 minutes the temperature was gradually reduced to 105 degrees F. Heating was continued at about 105 degrees F. for the next 2.25 hours, at the end of which time C was added. Over the next 2.25 hours, the temperature was maintained in the range of 150–165 degrees F., checking for NCO until none was found. The resultant material was refluxed with D for a short time and then allowed to foam to achieve deaeration, and finally cooled.

EXAMPLE 2

A sealant was prepared as follows:

|  | Parts by Weight |
|---|---|
| Polymer of Example 1 | 100 |
| High strength reinforcing carbon black e.g. Regal 300 R, dried to a moisture content less than 0.05% | 35 |
| Thixseal 1084 | 0.50 |
| Dibutyltin diacetate (DBTDA) | 0.08 |
| Antioxidant (A02246) | 0.65 |
| N-beta aminoethyl, gamma aminopropyl trimethoxy silane (A 1120) | 0.50 |

The polymer of Example 1, Thixseal 1084, DBTDA, anti-oxidant A02246 and A1120 silane were added to a dual shaft (sweep blade plus high speed disperser) mixer under anhydrous conditions and mixed for about 5–10 minutes. The mixer is kept at all times under a slight pressure (about 1 psi) of dry nitrogen. The carbon black dried to less than 0.05%, moisture is then added and the resultant mixture is then mixed ¾–1 hour. The resultant sealer is allowed to cool 10–15 minutes, degassed under reduced pressure and packaged under anhydrous conditions.

The following properties were obtained by testing representative examples of sealants made according to Example 2:

| | |
|---|---|
| Viscosity | 37 sec. |
| Tensile strength | 1100 psi |
| Elongation | 300 % |
| Slump | none |
| Curing speed (cleavage assemblies) | 87 psi at 3 hrs. |
| Hardness (Shore A Durometer) | 60 |

Although the sealant of this invention exhibits sealant and adhesive properties under normal conditions, in order to achieve the outstanding properties set forth above for automotive windshield use it is necessary to employ the glass and metal primers described below.

| Glass Primer | Percent by Weight | |
|---|---|---|
| Chlorinated Rubber | 5-35% | |
| Carbon Black (furnace type) | 2-20 | |
| Silane A1120 (See Example 2) | 0.1-2.0 | |
| Tinuvin 327 (2-(3',5'-ditert-butyl-2'-hydroxy phenyl)-5 chlorobenzotriazole from Ciba-Giegy) | 0.1-2.0 | |
| Conventional anhydrous solvent for chlorinated rubber | 20-80 | |
| Conventional plasticizer for chlorinated rubber | 25-200% | of amount of chlorinated rubber used |

The chlorinated rubber used in the glass primer should be a 5,000–20,000 molecular weight rubber having a 64–65% chlorine content. The chemistry and molecular structure of such rubbers is described in Treatise In Coatings, Vol. 1, Part 1 by Myers and Long (Dekker, 1967). Such rubbers can be obtained from ICI, for example Alloprene X-20, and Hercules (Parlon). Viscosity grades such as 5, 10, 20 or 125 can be used but grade 20 is preferred.

Conventional anhydrous aromatic hydrocarbon solvents for chlorinated rubber can be employed as solvent in the glass primer. The solvent employed must be anhydrous or the silane will be hydrolyzed and ruined.

The plasticizer employed in the glass primer should be selected from the group of polymeric polyester plasticizers which are compatible with chlorinated rubber. That group will be familiar to those skilled in the art. Paraplex G-56, a polymeric polyester plasticizer from Rohm & Haas, is preferred.

The preferred glass primer composition is:

| | Weight Percent Range |
|---|---|
| Alloprene X-20 chlorinated rubber | 15-20% |
| Paraplex G-56 plasticizer | 15-20 |
| Sterling R carbon black | 4-10 |
| Silane A-1120 | 0.5-1.0 |
| Tinuvin 327 U.V. screening agent | 1-2 |
| Anhydrous toluene | 50-60 |
| | 100% |

METAL PRIMER—FOR ACRYLIC LACQUERED STEEL

The metal primer is broadly the same as the broad glass primer composition, but with the following exceptions:

(1) omit the U.V. screening agent, (2) as plasticizer, a conventional monomeric plasticizer for chlorinated rubber, such as diisodecyl phthalate, is preferred. However, the class of polymeric plasticizers described for the glass primer may also be used.

| | Weight Percent Range |
|---|---|
| Alloprene X-20 chlorinated rubber | 16-23% |
| Diisodecyl phthalate plasticizer | 5-15 |
| Sterling R carbon black | 0.5-1.0 |
| Anhydrous toluene | 60-70 |
| | 100% |

The normal manner of use of the primers and sealant is to brush the glass primer on the perimeter of the windshield, air dry it for a few minutes and then deposit a bead of the sealant on the primed area. The acrylic lacquered body steel is also primed by brushing on the metal primer and allowing it to air dry for a few minutes. The sealant bead on the windshield is then firmly pressed against the body steel.

The adhesive properties of the sealant of this invention applied as described have proved to contribute substantially to the strength (resistance to crushing) of the roof of the automobiles on which they are used.

The sealant of this invention may also contain conventional sealant additives such as additional fillers, reinforcers, rheology modifiers and ultraviolet light screening compounds. The especially dry carbon black of the examples of this application is necessary to achieve the particular viscosity, slump and hardness properties required for the automotive windshield uses mentioned herein. The Thixseal rheology modifier, although not necessary to the broad invention, is necessary to provide the particularly demanding slump and viscosity properties of windshield sealants. Determination of effective amounts of these materials to achieve the desired properties will be within the skill of those skilled in the art.

It has been found that when the silanol condensation catalyst, such as dibutyltin diacetate is employed in amounts greater than 0.1%, based on the polymer weight, the adhesive properties of the sealant suffer degradation upon aging.

Use of the closely related material gamma aminopropyl trimethoxy silane (A-1110) in place of A-1120 has resulted in very significantly longer cure times. For example, the time required to reach 56 lbs/in$^2$ was 8 hours using A-1110 versus 2½ hours with A-1120.

When the preferred polymer capping organosilicon (gamma aminopropyl trimethoxy silane) is used in the reaction above, R is $CH_3$, R' is $C_3H_6$, and Z is NH.

Although this specification has largely concerned itself with achieving the demanding properties required for automotive windshield sealants, those skilled in the art will appreciate that sealants for less demanding applications can be made outside the ranges specified herein.

APPENDIX

Test Methods

Cure Rate (Cleavage)

A 4"×¼" bead is extruded on one primed, acrylic lacquered plate. Then another plate is placed on top. The plates are pulled in a plane perpendicular to the plane of the bead.

Viscosity

Viscosity is determined by timing the flow of 20 gms. of sealant through a 0.104" orifice at 60 psi pressure. K value is determined by measuring the viscosity at 60 psi and again at 30 psi pressure and inserting the two values thus obtained into the equation for K value:

$$K = P \times t^n \text{ where } n = \frac{\log P_1 - \log P_2}{\log t_2 - \log t_1}$$

Slump or Sag Characteristics

A ¼"×¼" cross section sealant bead is applied to a glass plate and allowed to cure in the vertical plane. The sealant should not move downward or "slump" or "sag" but rather should remain in the original position.

Hardness

Hardness of the cured sealant is measured by a Shore "A"-2 Durometer.

Tensile and Elongation

Tensile strength and elongation at break are determined according to ASTM method D412 (using Die C).

We claim:

1. In a sealant composition comprised of a prepolymer which is a blend of:

(a) a silicon terminated vulcanizable polyurethane polymer of the formula

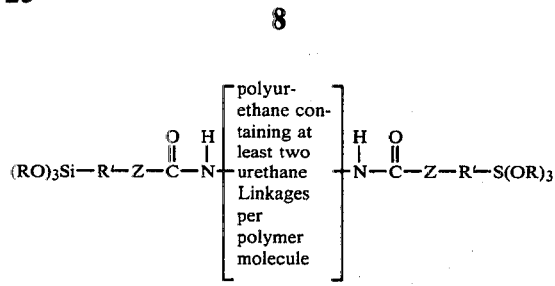

wherein R is a lower alkyl radical of from 1 to 6 carbon atoms, R' is a divalanet bridging radical selected from the group consisting of a divalent hydrocarbon radical, and a divalent hydrocarbon ether radical, and wherein Z is a member selected from the group consisting of S and NR", where R" is H or a lower alkyl radical of from 1 to 6 carbons with (b) a small amount of N-beta aminoethyl, gamma aminopropyl trimethoxy silane, the improvement comprising adding, as a reinforcing filler, a high strength carbon black containing less than 0.05% of water to obtain a sealant having a viscosity as indicated by K value of less than 850, and a cure speed of at least 70 psi cleavage in three hours elapsed time.

2. The sealant composition of claim 1 containing up to 25% by weight of plasticizer based on weight of polymer.

3. The sealant composition of claim 1 having a tensile strength of at least 900 psi and an elongation at break of at least 250%.

4. The sealant composition of claim 1 having a cleavage value of at least 70 psi after 3 hours.

5. The sealant composition of claim 4 wherein the catalyst is dibutyl tin diacetate.

6. The sealant composition of claim 5 wherein R is $CH_3$, R' is $C_3H_6$ and Z is NH.

* * * * *